US006760466B2

(12) United States Patent
Wang et al.

(10) Patent No.: US 6,760,466 B2
(45) Date of Patent: Jul. 6, 2004

(54) AUTOMATIC IMAGE REPLACEMENT AND REBUILDING SYSTEM AND METHOD THEREOF

(75) Inventors: Ta-Chun Wang, Taipei Hsien (TW); Wen-Jen Ho, Hualien (TW)

(73) Assignee: Institue of Information Industry, Taipei (TW)

( * ) Notice: Subject to any disclaimer, the term of this patent is extended or adjusted under 35 U.S.C. 154(b) by 601 days.

(21) Appl. No.: 09/771,787

(22) Filed: Jan. 29, 2001

(65) Prior Publication Data

US 2002/0075279 A1 Jun. 20, 2002

(30) Foreign Application Priority Data

Dec. 19, 2000 (TW) ........................................ 89127143 A

(51) Int. Cl.[7] ........................... G06K 9/46; G01B 11/30
(52) U.S. Cl. ..................... 382/111; 382/165; 382/287; 382/294; 345/619; 356/616; 26/70
(58) Field of Search ............................. 382/100, 111, 382/110, 162, 103, 107, 165, 294, 287; 345/426, 619; 356/616, 238.1; 700/130, 131, 132, 135; 73/159; 26/70

(56) References Cited

U.S. PATENT DOCUMENTS

| | | | | |
|---|---|---|---|---|
| 4,539,585 A | * | 9/1985 | Spackova et al. | 382/100 |
| 4,949,286 A | * | 8/1990 | Ohba | 345/585 |
| 5,175,806 A | * | 12/1992 | Muskovitz et al. | 345/582 |
| 5,495,568 A | * | 2/1996 | Beavin | 700/83 |
| 5,557,527 A | * | 9/1996 | Kotaki et al. | 700/131 |
| 5,566,251 A | * | 10/1996 | Hanna et al. | 382/284 |
| 5,615,318 A | * | 3/1997 | Matsuura | 345/420 |
| 5,798,766 A | * | 8/1998 | Hayashi et al. | 345/595 |
| 6,307,568 B1 | * | 10/2001 | Rom | 345/629 |
| 2003/0074099 A1 | * | 4/2003 | Yan | 700/132 |

OTHER PUBLICATIONS

Silva et al, A New Interface Paradigm for Motion–Capture––Based Animation Systems, Proceedings of the 8th Eurographics Workshop on Computer Animation & Simulation, Sep. 1997, pp. 19–36.*

Foley et al, Computer Graphics Principles and Practice, Addison–Wesley Publishing Company, Second Edition, 1990, pp. 1073.*

* cited by examiner

Primary Examiner—Bhavesh M. Mehta
Assistant Examiner—Christopher Sukhaphadhana
(74) Attorney, Agent, or Firm—Thomas, Kayden, Horstemeyer & Risley

(57) ABSTRACT

An automatic image replacement and rebuilding system and method thereof which can replace and rebuild the image automatically. The system includes an input module; a processing module; a storage module; and an output module. The input module inputs external image data into the system. The processing module is coupled to the input module to receive the image data, then analyzes the shading value and the direction of the sample object in the image data, and outputs an access signal and an output signal. The storage module coupled to the processing module to receive the access signal, and is stored or read out on a replaced image, and the output module coupled to the processing module to receive the output signal, and outputs the image data. In addition, the automatic image replacement and rebuilding method, which is suitable for a system with a processing module and a storage module, by analyzing the shading value and the direction of the image of the sample object having a white background and dark grid characteristics, so that the image can be replaced and rebuilt.

8 Claims, 2 Drawing Sheets

AUTOMATIC IMAGE REPLACEMENT AND REBUILDING SYSTEM AND METHOD THEREOF

BACKGROUND OF THE INVENTION

1. Field of the Invention

The present invention relates to an automatic image replacement and rebuilding system and method thereof, using the image processing techniques to analyze the shading value and direction of the surface material, so as to replace other materials with different color and grain, and rebuild the image.

2. Description of the Related Art

In conventional methods, we have to make another object using the other surface material actually when we want to replace the object-image in one picture. However, if there are several choices for designers to consider, they have to make several objects corresponding to several surface materials, respectively. Therefore, the whole design procedure will waste time and waste resources.

SUMMARY OF THE INVENTION

It is therefore an object of the present invention is to provide an automatic image replacement and rebuilding system and method thereof, using image processing techniques to analyze the shading value and direction of the surface material, so that designers don't have to make objects actually. Moreover, the design time will be shortened, and reduce the resources wasted.

To achieve the above object, the present invention provides an automatic image replacement and rebuilding system, comprising: an input module for inputting external image data; a processing module coupled to the input module, that receives the image data, analyzes the shading value and the direction of the sample object in the image data, and outputs an access signal and an output signal; a storage module coupled to the processing module to receive the access signal, that stores or reads out a replaced-image; and an output module coupled to the processing module to receive the output signal, and outputs new image data.

In addition, the present invention also provides an automatic image replacement and rebuilding method, which is suitable to a system with a processing module and a storage module, by analyzing the shading value and the direction of the image of the sample object having a white background and dark grid characteristics, so that said image can be replaced and rebuilt.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE PREFERRED EMBODIMENT

Figure 1:
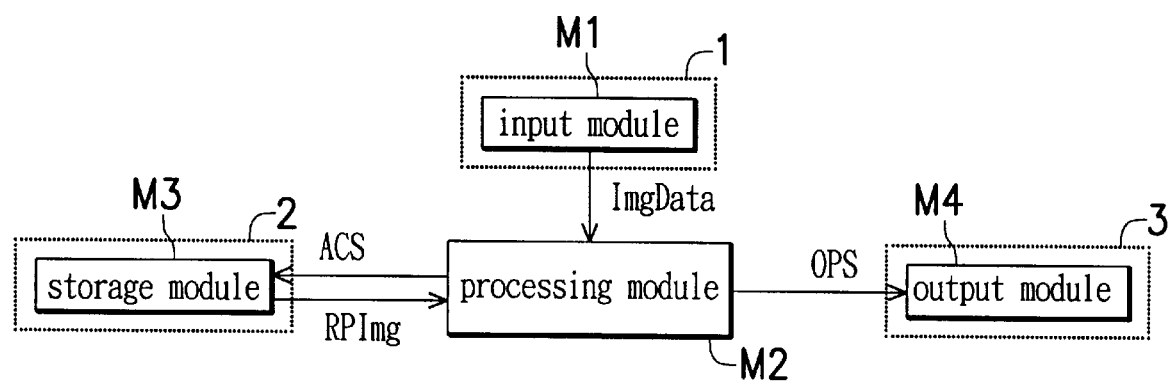
FIG. 1 is a block diagram showing a structure of the system according to the present invention.

As shown in FIG. 1, an automatic image replacement and rebuilding system, comprising an input module M1 for inputting external image data, and they are scanners, pc cameras, and digital cameras 1 in existing systems.

A processing module M2, is a computer processing unit, coupled to the input module M1 to receive the image data ImgData, analyzing the shading value and the direction of the sample object in the image data, and output an access signal ACS and an output signal OPS.

A storage module M3, is a database system 2, coupled to the processing module M2 to receive the access signal ACS, and to store or read out the replaced-image RPImg.

And an output module M4, coupled to the processing module M2 to receive the output signal OPS, and outputs the new image data, and they are monitors, printers, and graphers 3 in existing systems.

First, one surface material having a white background and dark grid characteristics is used to made a sample object, and to shoot this sample object to be a two-dimensional or three-dimensional image data ImgData, and input to the system via the input module M1.

Then, the processing module M2 analyzed the color of the image data ImgData, and used a simple filter technique of image processing to filter the dark color of the grid, as a result a white background and filtered image is obtained. Then, by comparing the image data ImgData with the filtered image, the position and the direction of the grid in image data ImgData is marked. On the other hand, a simple gray technique for image processing may be used to transform the image data ImgData into a gray image.

Then, by subtracting the difference of the brightness caused by the dark color of the grid at the position in image data ImgData from the gray image, we can get the shading value of the sample object. In addition, the processing module M2 outputs an access signal ACS to the storage module M3 according to the choice of the designer (not shown in FIG. 1), and the storage module M3 reads out a replaced-image RPImg to prepare for replacement. Then, the intersection points of all lines are marked according to the position and the direction of the dark grid in image data ImgData.

Then, defining virtual grid points in this replaced-image RPImg, and comparing the virtual grid points in this replaced-image RPImg with the intersection points in image data ImgData, and the corresponding relation is performed.

Then, applying the affine transform of graph theory in said corresponding relation, so that the replaced-image RPImg is skewed in the same direction as image data ImgData, and applies the shading value in this skewed image of replaced-image RPImg.

When all of the blocks of the sample object are replaced in the same method, the image replacing and rebuilding process is finished. At the same time, the Processing module M2 outputs an output signal OPS to the output module M4, and the output module M4 outputs the new image.

Figure 2:
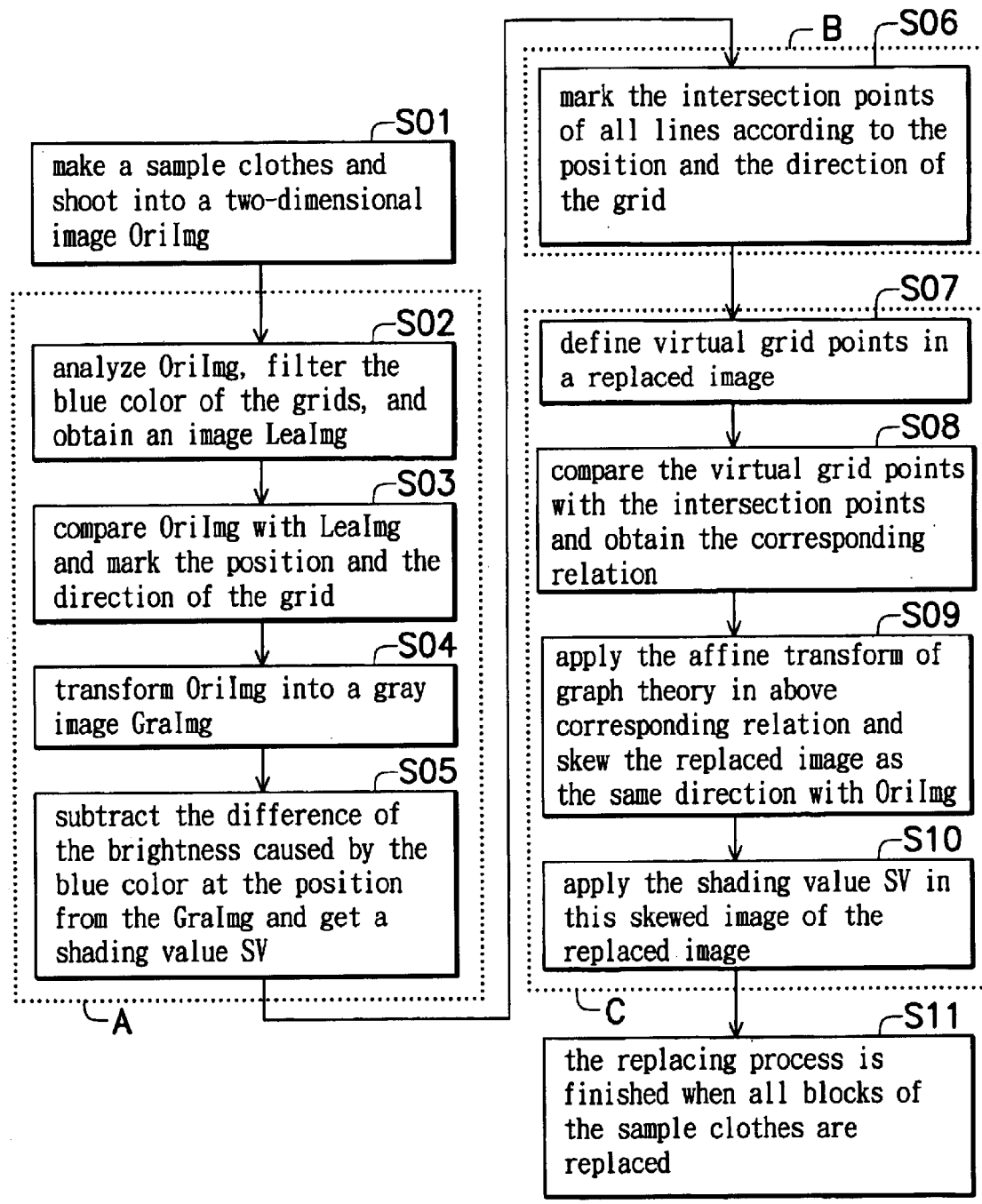
FIG. 2 is a schematic diagram showing a process procedure of an automatic cloth select and design system according to the embodiment of the present invention.

Next, referring to FIG. 2, FIG. 2 is a schematic diagram showing a process procedure of an automatic cloth select and design system according to an embodiment of the present invention. In this figure, the part of inputting the image data to the system and the part of outputting a new image are omitted, and this embodiment is based on one cloth having a white background and blue grid characteristics.

In FIG. 2, "A" represents a block that analyzing the shading value according to the basic characteristics of the sample cloth in the system, "B" represents a block that analyzes the direction according to the basic characteristics of the sample cloth in the system, and "C" represents a block that replaces the image according to above shading value and direction in the system.

First, in step S01, the cloth having a white background and blue grid characteristics is utilized to make a sample clothes, and to shoot the sample clothes into a two-dimensional image OriImg.

Then, in step S02, analyzing the color of the OriImg, and a using simple filter technique of image processing to filter the blue color of the grid, as a result a white background and filtered image LeaImg is obtained. Then, in step S03, by comparing OriImg with LeaImg, the position and the direction of the grid in OriImg is marked. On the other hand, as in step S04, using a simple gray technique for image processing will transform OriImg into a gray image GraImg.

Then, in step S05, by subtracting the difference of the brightness caused by the blue color of the grid at the position in OriImg from GraImg, we can get the shading value SV of the sample clothes. Then, in step S06, the intersection points of all lines are marked according to the position and the direction of the grid in OriImg.

Then, in step S07 and S08, defining virtual grid points in a replaced-image, and comparing the virtual grid points in this replaced-image with the intersection points in OriImg, and the corresponding relation is performed.

Then, in step S09 and S10, applying the affine transform of graph theory in above corresponding relation, so that the replaced-image was skewed in the same direction with OriImg, and applying the shading value SV in this skewed image of the replaced image.

Finally, as in step S11, when all of the blocks of the sample clothes are replaced by the same method, the image replacing and rebuilding process is finished.

As a result, designers can use the automatic cloth select and design system according to the embodiment of the present invention to design clothes, and to replace the different color and grain materials. Furthermore, the design time will be shortened, and reduce the resources wasted.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. An automatic image replacement and rebuilding method, which is suitable for a system with a processing module and a storage module, by analyzing shading values and directions of an image of a sample object having a white background and dark grid characteristics, so that said image can be replaced and rebuilt, comprising the steps of:

(a) analyzing a color of the image of said sample object, and filtering the color of said dark grid;

(b) by comparing the image, which has filtered the color of said dark grid with the image of said sample object, a position and a direction of said dark grid is marked;

(c) transforming the image of said sample object into a gray image;

(d) subtracting the brightness difference caused by said dark grid at said position from said gray image; and (e) the intersection points of all lines are marked according to said position and said direction of said dark grid.

2. The method as claimed in claim 1 wherein the color of said dark grid is blue.

3. The method as claimed in claim 1 wherein said sample object is a cloth.

4. The method as claimed in claim 1 wherein the image of said sample object is a two-dimension image.

5. The method as claimed in claim 1 wherein the image of said sample object is a three-dimension image.

6. The method as claimed in claim 1 further comprising inputting said image data.

7. The method as claimed in claim 1 further comprising outputting said image data.

8. The method as claimed in claim 1 wherein the steps of replacing and rebuilding said image, comprise:

(a) defining virtual grid points in a surface material;

(b) comparing said virtual grid points in said surface material with the intersection points in said image of said sample object, and obtaining a corresponding relation of skewed grid causing by the different directions;

(c) applying the affine transform of graph theory in said corresponding relation, so that said surface material is skewed in the same direction with said image of said sample object; and (d) applying said shading value in said skewed image of said surface material.

\* \* \* \* \*